Oct. 9, 1923.
E. G. K. ANDERSON
SPOT AND EXTENSION LAMP
Filed Aug. 10, 1921
1,469,981
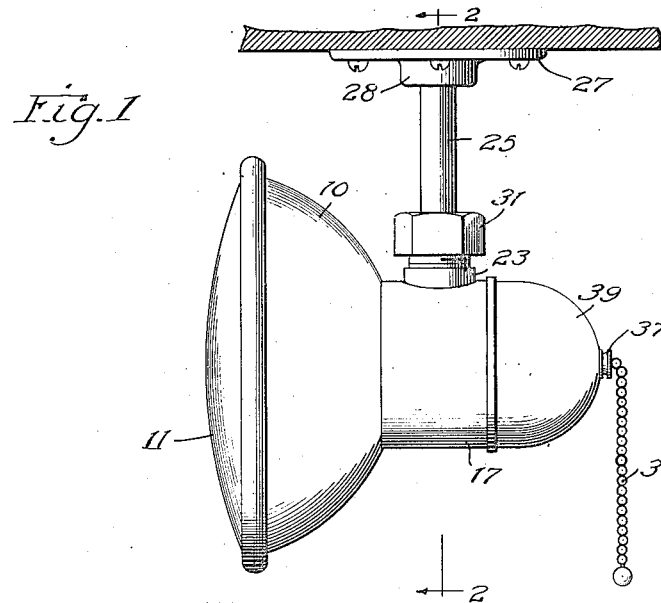
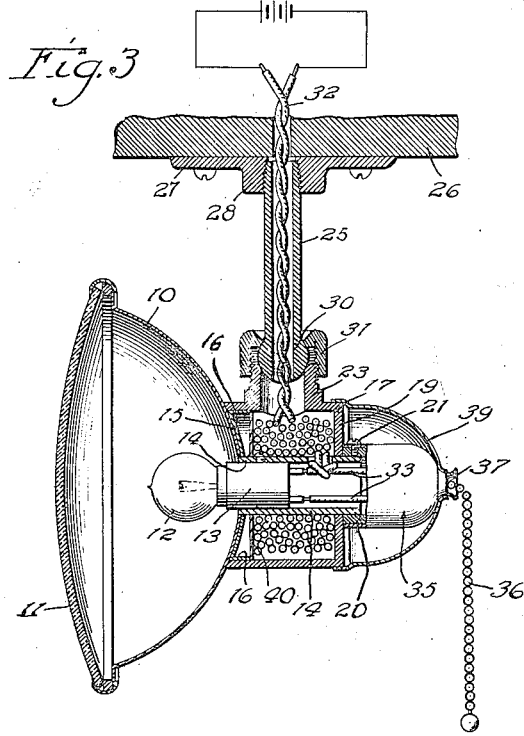
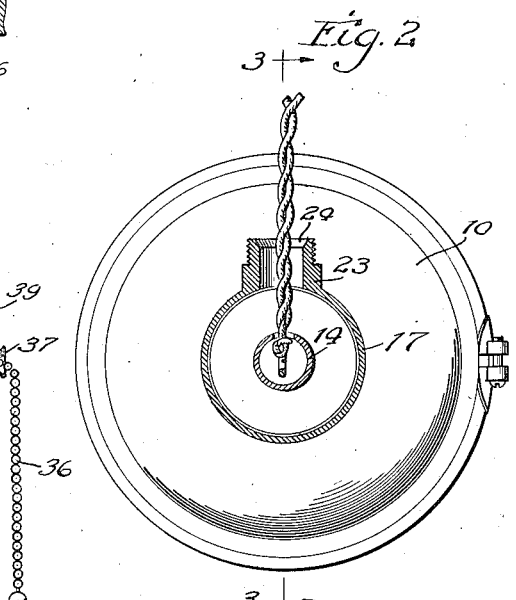
Inventor:—
ERNST G.K. ANDERSON Patented Oct. 9, 1923.

1,469,981

UNITED STATES PATENT OFFICE.

ERNST G. K. ANDERSON, OF CHICAGO, ILLINOIS, ASSIGNOR, BY MESNE ASSIGNMENTS, TO APPLETON ELECTRIC CO., OF CHICAGO, ILLINOIS, A CORPORATION OF ILLINOIS.

SPOT AND EXTENSION LAMP.

Application filed August 10, 1921. Serial No. 491,077.

*To all whom it may concern:*

Be it known that I, ERNST G. K. ANDERSON, a citizen of the United States, and a resident of Chicago, in the county of Cook and State of Illinois, have invented certain new and useful Improvements in Spot and Extension Lamps; and I do hereby declare that the following is a full, clear, and exact description thereof, reference being had to the accompanying drawings, and to the characters of reference marked thereon, which form a part of this specification.

This invention relates to a novel spot or search lamp and mounting therefor, more especially adapted for vehicles, and refers more particularly to a device of this kind which is particularly adapted for closed body vehicles. The lamp structure herein shown is of such construction and arrangement that it can be suspended from the roof of a closed body vehicle in rear of the glass front of such bodies; the mounting of the lamp being such as to enable the lamp casing to be swung in angular positions to direct the rays from the lamp through a wide angular throw.

Among the objects of the invention is to provide a lamp structure of this character which is simple and efficient, and which can be suspended from the roof of a closed body vehicle and operated by the driver within the vehicle for the purposes of a spot or signal lamp.

The invention relates further to improvements in that type of demountable lamps wherein the lamp is connected to a source of current supply through the medium of a long lamp cord which, when the lamp occupies its normal station on the vehicle, is wound about a suitably located reel, and from which the cord can be unwound when the lamp is demounted and moved away from its normal station to function as a trouble lamp, upon which reel the cord is rewound when the lamp is returned to and mounted at its normal station on the vehicle.

In respect to this aspect of the invention, the conductors of the lamp cord can be directly connected to the source of current supply, and the cord can be wound directly on a reel so connected to the lamp structure whereby, when the lamp is demounted from its normal station and carried about the vehicle or other support for the lamp structure, the tension on the lamp cord, which is connected to the source of current supply, causes the lamp casing to revolve with the reel when the cord is being unwound from the reel; and the cord can be wound on the reel by power applied through the lamp casing when the lamp is returned to the normal station of the lamp. This phase of the invention, however, may be applied to lamp structures which are mounted differently on their supports from that shown in the drawing and in which the current is otherwise conducted to the lamp.

Other objects of the invention are to improve and simplify lamp structures of this general character, and the invention consists in the combination and arrangement of the parts shown in the drawing and described in the specification, and is pointed out in the appended claims.

In said drawings;

Figure 1 is a side elevation of a combined spot or search light, its reel casing, and support.

Figure 2 is a section on the line 2—2 of Figure 1.

Figure 3 is a section on the line 3—3 of Figure 2.

In said drawings, 10 designates the lamp casing, shown of the single shell type, with its inner concave face mirrorized to constitute a reflector, and 11 designates the usual lens applied over the open front side of the casing. 12 designates a lamp whose base is mounted on a socket shell 13. Said shell is fitted in a sleeve 14, which is in alignment with the focal axis of the reflector face and extends rearwardly from the casing. Said sleeve or tubular extension is rigidly fixed to the casing in any suitable manner, as by being brazed or otherwise fixed to a concave plate 15 that can be fastened to the rear side of the casing in any suitable manner. Said plate has a rearwardly extending marginal flange 16 concentric with the sleeve 14.

17 designates a cylindric shell that surrounds and is concentric to the sleeve 14. Said shell is open at its forward end, or that adjacent to the lamp casing, and is there supported on the flange 16 so as to permit relative turning movement of the flange and the shell 17. The shell is provided at its other end with an end wall 19 that is formed with a central opening, through which the rear end of the sleeve 14 extends. The shell is locked from axial movement with respect to said sleeve and the lamp casing by means of a collar 20 which is fitted over the sleeve exterior to the end wall 19 of the shell and which is, in turn, locked on said sleeve by a set screw 21.

The said sleeve 14 has a bearing fit in the opening of the end wall 19 of the shell 17, and the bearing between said end wall and sleeve, at one end of the sleeve, and between the cylindric wall of the shell 17 and the flange 16, at the other end, affords means by which said shell 17 is supported concentrically with respect to the sleeve 14, and also means whereby there is relative movement of rotation between the shell and the lamp casing. In the present instance, the said shell is fixed so that the positive rotational movement is that of the lamp casing and its sleeve 14 attached thereto, the latter constituting a reel.

The said shell 17 is provided with an upstanding hollow, externally threaded neck 23 which is formed at its upper end with a part-spherical internal bearing surface 24. 25 designates a rigid suspending hanger which can be attached to an overhead support in any suitable manner, as the ceiling 26 of a closed body car. The means of attachment shown comprises a plate 27 that is formed with a thickened, internally screw threaded boss 28 to receive the upper screw threaded end of the stem or shank 25.

The lower end of said stem or shank is formed with a spherical bearing portion 30 which is adapted to engage said part-spherical bearing 24 of the neck 23, and to also engage a complemental spherical, internal bearing of a nut 31 that is applied over and threaded to the neck 23, said nut being tubular to receive the hanger 25.

With this construction it will be noted that there is provided between the hanger stem 25 and the neck of the shell 17 a joint in the nature of a ball and socket joint which permits considerable freedom of universal angular movement of the lamp casing and the shell 17, so as to thereby enable the rays of the lamp to be projected through a large angular throw in forward direction from the normal station of the lamp structure on the car.

32 designates a lamp cord which is connected to any suitable source of current supply, as indicated in Figure 3. The conductors of said cord are twisted in a known manner, and said cord is wound about the sleeve 14 of the lamp casing. Said conductors of said cord are attached within said sleeve to conductors 33 that are connected to the socket terminals and also to a suitable switch, not shown, the latter usually enclosed in a hood casing 35. The switch is indicated as of the pull type and is operated by a chain 36 which extends through the bell mouth opening 37 of a shell 39 in a known way. The details of the switch, however, constitute per se no part of the present invention and need not be further described. The spherical hood 39 spun is over the rear end of the shell 17 to enclose and protect said switch mechanism.

It will be observed that the annular space between the cylindric wall of the shell 17 and the sleeve 14 is ample to receive a cord of considerable length when wound about the said sleeve, said cord space extending from the end wall 19 of said shell to a disc 40 near the forward end of said sleeve 14.

In operation, the lamp casing together with the shell 17, can be swung through a large angular movement to project the rays of the lamp through wide angles of throw in all forward directions. When the lamp structure is to be demounted to use the lamp as a trouble lamp, the nut 31 is unscrewed from the neck 23 so as to permit the lamp structure to drop away from the suspending stem 25. Thereafter the lamp may be carried to any point within the length of the lamp cord 32, and as the lamp is carried away from its normal station the cord is unwound from the reel support constituted by the sleeve 14 and causes said reel and the casing to be rotated about the axis of said sleeve in one direction. When the lamp is to be returned to its normal station, the cord is rewound on the reel by grasping the lamp casing and turning it in the other or opposite direction, while moving toward the normal station of the lamp on the vehicle or other support, and the parts are connected together by inserting the spherically seated neck against the ball 30, and thereafter screwing the nut 31 in place. Conveniently the hanger 25 and the ball 30 are made hollow and the lamp cord 32 is trained from said reel upwardly through the tubular or hollow portions for connection to a suitable source for supplying current.

It will be obvious that the construction described is an exceedingly simple one, economical to manufacture, and capable of ready operation both as a universally adjustable lamp and as a trouble lamp. The details of the lamp and its mounting may be varied within the spirit and scope of the claims hereto appended, and the invention is not limited to the precise details shown, except as to claims wherein they are specifically set forth, and as imposed by the prior art.

I claim as my invention:

1. In an extension spot lamp, a casing for the lamp, a reel for a lamp cord fixed to and rotative with said lamp casing and a bearing structure and reel enclosing shell having means of attachment to a support and in which said reel is mounted for rotation.

2. An extension spot lamp comprising a lamp casing, a shell for a reel fixed relatively to said casing, a lamp cord rotative reel in said shell and connected to said casing to be rotated thereby to rewind the cord on said reel, a bearing structure within said shell to rotatively support said reel and therethrough said casing, and a support for the lamp connected to said shell and including a universally swingable and a demountable joint for the purpose set forth.

3. An extension lamp comprising a supporting and enclosing shell for a lamp cord reel and provided with a lamp cord outlet, and a lamp casing and attached reel, the reel being rotatively supported in said shell and the lamp casing being fixed to said reel to be supported thereby and to rotate with the reel.

4. An extension lamp comprising a supporting and enclosing shell for a lamp cord reel and provided with a lamp cord outlet, a lamp casing and attached reel, the reel being rotatively supported in said shell and the lamp casing being fixed to said reel to be supported thereby and to rotate with the reel, a fixed support and a demountable connection between said fixed support and shell constructed to permit angular adjustment of the shell and thereby the lamp casing relatively to said fixed support.

5. An extension lamp comprising a lamp casing, a member fixed to the lamp casing to rotate therewith and to constitute a reel for a lamp cord, a shell to support the lamp casing and said member and in which the member is enclosed and rotatively mounted, a detachable connection to support said shell and having means of attachment to a closed body top, and a lamp cord wound about the reel and adapted for connection to a source of current supply whereby, when said lamp is demounted, the cord is wound off the reel, thereby turning the latter and the lamp casing, and whereby the cord can be wound on the reel by rotating the reel through rotation of the lamp casing.

6. An extension lamp comprising a lamp casing, a reel fixed to and rotative with said casing, a lamp cord wound on the reel and adapted for connection to an external current supply source, and a depending connection for supporting the structure from a fixed support including a demountable structure in said connection whereby, when the lamp is demounted, the cord will unwind from the reel, thereby turning it and the lamp, and whereby, when the lamp is turned, the cord is rewound on the reel.

7. A spot lamp comprising a lamp casing, a reel fixed to and rotative with the lamp casing, a shell surrounding the reel by which said member and lamp casing are rotatively supported, and a support for said shell embracing a demounting and universally movable joint.

8. In a demountable spot lamp, a lamp casing, a reel fixed to and rotative therewith, embracing a spool on which a lamp cord is adapted to be wound, and a shell through which said spool extends and having a bearing for the spool, the shell itself having a larger bearing for rotative mounting of a part of the lamp casing whereby the casing and spool may rotate relatively to the shell.

9. In a demountable spot lamp, a lamp casing having a reflector, a reel fixed to and rotative therewith, embracing a spool on which a lamp cord is adapted to be wound, and a shell through which said spool extends and having a bearing for the spool, the shell itself having a larger bearing for rotative mounting of a part of the casing whereby the casing and spool may rotate relatively to the shell, said spool being coaxial with the focal axis of the reflector and formed at its forward end to receive the socket for a lamp base.

10. A spot lamp comprising a lamp casing, a reel fixed to and rotative therewith, embracing a spool on which the lamp cord is adapted to be wound, a shell through which said spool extends and having a bearing for the spool, the shell itself having a larger bearing for rotative mounting of a part of the lamp casing, whereby the casing and spool may rotate relatively to the shell, said shell being provided with a threaded nipple through which a lamp cord from the reel is adapted to extend, a tubular mounting stem arranged in axial prolongation of the nipple, said mounting stem and nipple having mutual cooperative spherical surfaces to permit angular adjustment of the lamp casing relatively to the mounting, and the parts being separable at said joint whereby the lamp casing and parts associated therewith can be moved away from the stem.

In witness whereof I claim the foregoing as my invention, I hereunto append my signature this 27 day of July, 1921.

ERNST G. K. ANDERSON.